56 HARVESTERS.

164

BEST AVAILABLE COPY

H. H. Scoville.

Harvester Rake.

No. 4,194.

Reissued. Dec. 6. 1870.

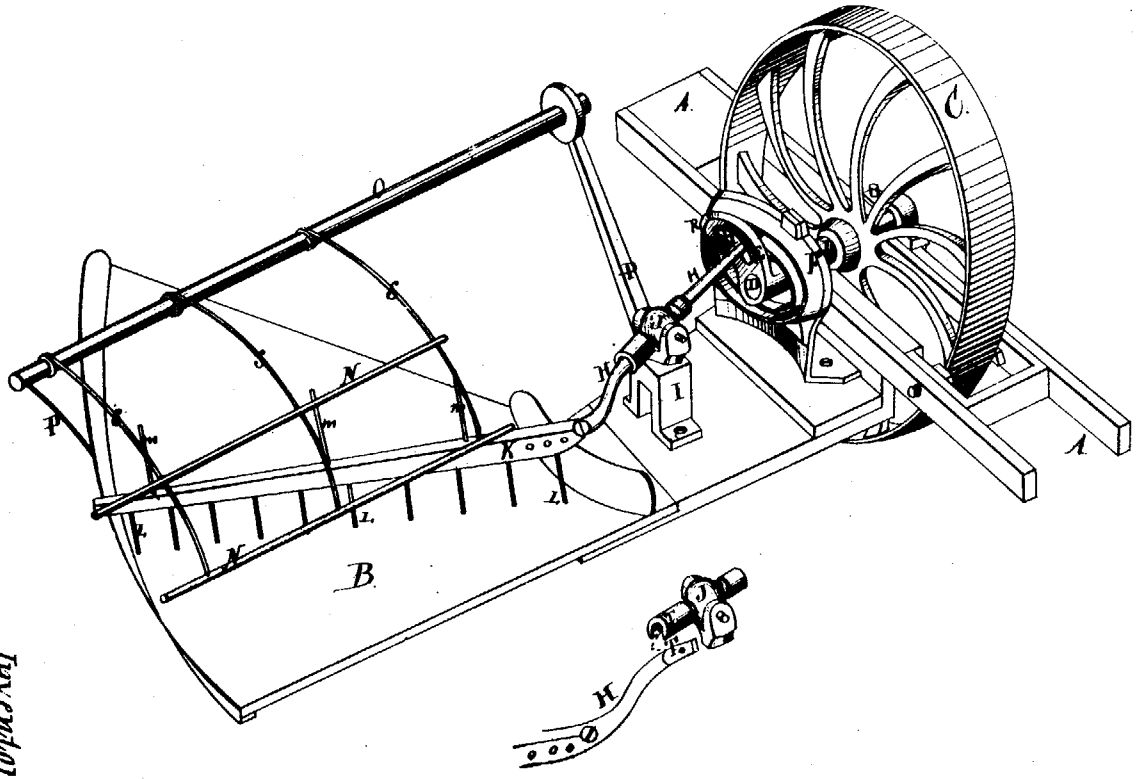

Witnesses:
F. G. Clayton
V. O. Clayton

Inventor:
H. H. Scoville
By C. P. Russell
Attorney 4,194.—Harvester Rake, [illegible] H. Scoville, Oakland, Cal., assignor of one-half interest to Joseph R. Scoville.—Patented No. 23,613, dated April 12, 1859.

*Claim.*—1. The stationary cam F, on or in which the rear end of the lever H operates, for directing the movement of the rake K in combination with the crank E, these parts being constructed substantially as described, and operating as and for the purposes set forth.

2. The combination of the F [illegible] and rock-lever H, with [illegible] and operating substantially [illegible] the purposes set forth.

UNITED STATES PATENT OFFICE.

HIRAM H. SCOVILLE, OF OAKLAND, CALIFORNIA, ASSIGNOR OF ONE-HALF INTEREST TO JOSEPH A. SCOVILLE.

IMPROVEMENT IN HARVESTER-RAKES.

Specification forming part of Letters Patent No. 23,613, dated April 12, 1859; reissue No. 4,194, dated December 6, 1870.

*To all whom it may concern:*

Be it known that I, HIRAM H. SCOVILLE, of Oakland, Alameda county, and in the State of California, formerly of Syracuse, Onondaga county, in the State of New York, have invented a new and useful Improvement in the Mode of Operating Rakes for Harvesting-Machines; and I do hereby declare the following to be a full, clear, and exact description of the construction and operation of the same, reference being had to the accompanying drawings, and to the letters of reference marked thereon.

The nature of my invention consists in the use of a stationary cam, which gives the required motion to the rake, as the rear end of the lever to which the rake is attached traverses in or on the cam throughout its entire circuit, the said lever being moved forward by the slotted crank.

In the drawings, A represents the frame-work of the reaping-machine. B is a platform, connected with the frame A and sickle-bar, the platform being attached to receive the falling grain, in order that it may be raked into gavels for binding. C is a bearing and driving wheel, which may be connected, by gearing or otherwise, to the sickle, and having upon its shaft D a slotted and curved crank, E. F is a stationary cam firmly attached to the frame A, and surrounding the shaft D. H is a crooked lever, to which the head of the rake is attached, and which is connected to the platform B by the standard I, on the top of which is the universal joint J, which acts as the fulcrum of the lever H. K is the head-bar of the rake, having teeth L projecting downward, and three or more small iron rods, *m*, projecting upward from the rake-head as guards for the canvas. N is the frame-work of the apron, connected to the cross-bar O, which is sustained by the standards P P.

The crank E should be made of metal of sufficient strength, having the slot R sufficiently large to allow the passage of the lever H, and its free movement therein, as the rear end of the lever H is made to traverse the circuit of the cam F by being pressed forward by the said crank E.

The lever H has for its fulcrum standard I, on which it rocks or vibrates, while the rear end of the lever H passes into the cam F, and as it is made to follow around in or on said cam, the required motion is given to the rake at the exact time. Each time the lever traverses the circuit of the cam F, the rake, in its sweep, carries the grain off the platform, and leaves it in gavels ready for binding. The rake is then raised and returned to the front, ready to perform a similar operation.

The stationary cam may be made of cast-iron, and in any form necessary to communicate the required motion to the rake, the cam serving as a guide, while the crank carries forward the lever.

As the grain is cut by the sickle it falls back upon the platform, and as the rake passes forward, it carries forward the apron sufficiently to receive the grain, while the rake moves back that which had previously fallen. As the rake moves back the apron follows it and drops the grain, causing a separation, and preventing the grain from falling over the top of the rake.

In the crooked lever H, at some point between the rake-head and standard, I make a joint, T, which will allow the head of the rake to be elevated to correspond with the rising and falling of the platform as it passes over the uneven ground.

The frame-work N may be covered with cloth, to form the apron for the separation of the grain, and so connected with the bar O that each of the wires or rods *s s s* may act as a spring to press the apron against the rake, and cause it to follow its motions with promptness; or it may be connected to the bar O by joints, so as to rest by its weight against the rake, instead of the rods acting as springs.

Having thus fully described my invention, what I claim as new, and desire to secure by Letters Patent, is—

1. The stationary cam F, on or in which the rear end of lever H operates for directing the movement of the rake K, in combination with crank E, these parts being constructed substantially as described, and operating as and for the purposes set forth.

2. The combination of cam F, crank E, standard I, and rake-lever H, with rake attached, constructed and operating substantially in the manner and for the purposes set forth.

HIRAM H. SCOVILLE.

In presence of—
WM. HOSKINS,
P. BAKER.